United States Patent
Lee et al.

(10) Patent No.: US 11,505,663 B2
(45) Date of Patent: Nov. 22, 2022

(54) METHOD FOR MAKING SILK PROTEIN FILM

(71) Applicants: Southern Taiwan University of Science and Technology, Tainan (TW); Taiwan Pioneer Biotech Co., Ltd., Tainan (TW); Univacco Technology Inc., Tainan (TW)

(72) Inventors: Song-Tay Lee, Tainan (TW); Nan-Kai Lin, Tainan (TW); Kuo-Lung Tsai, Tainan (TW)

(73) Assignees: Southern Taiwan University of Science and Technology, Tainan (TW); Taiwan Pioneer Biotech Co., Ltd., Tainan (TW); Univacco Technology Inc., Tainan (TW)

( * ) Notice: Subject to any disclaimer, the term of this patent is extended or adjusted under 35 U.S.C. 154(b) by 508 days.

(21) Appl. No.: 16/786,234

(22) Filed: Feb. 10, 2020

(65) Prior Publication Data

US 2020/0255610 A1    Aug. 13, 2020

(30) Foreign Application Priority Data

Feb. 11, 2019  (TW) ................. 108104427

(51) Int. Cl.
| | |
|---|---|
| *B05D 1/02* | (2006.01) |
| *C08J 5/18* | (2006.01) |
| *C08K 5/053* | (2006.01) |
| *C08K 5/1545* | (2006.01) |
| *B05D 3/02* | (2006.01) |
| *B05D 1/00* | (2006.01) |

(52) U.S. Cl.
CPC .............. *C08J 5/18* (2013.01); *B05D 1/005* (2013.01); *B05D 1/02* (2013.01); *B05D 3/0254* (2013.01); *C08K 5/053* (2013.01); *C08K 5/1545* (2013.01); *C08J 2389/00* (2013.01)

(58) Field of Classification Search
CPC ........ B05D 1/005; B05D 1/02; B05D 1/0354; C08J 5/18; C08J 2389/00; C08K 5/053; C08K 5/1545
USPC ..................... 427/240, 421.1, 389
See application file for complete search history.

(56) References Cited

U.S. PATENT DOCUMENTS

| | | | | |
|---|---|---|---|---|
| 5,718,954 A * | 2/1998 | Sano | ..................... | B32B 27/304 524/21 |
| 8,354,501 B2 * | 1/2013 | Kaplan | ................... | A61L 15/44 252/8.86 |
| 9,731,052 B2 * | 8/2017 | Kaplan | ..................... | A61J 3/00 |
| 2011/0223153 A1 * | 9/2011 | Lu | ........................ | B05D 3/0254 435/395 |
| 2013/0287835 A1 * | 10/2013 | Kaplan | ................ | C09D 189/00 514/180 |
| 2015/0094269 A1 * | 4/2015 | Altman | .................... | A61K 8/27 206/524.1 |
| 2015/0183841 A1 * | 7/2015 | Lo | ........................... | A61L 27/52 264/164 |
| 2015/0202304 A1 * | 7/2015 | Kaplan | ................ | A61K 9/1075 264/4.1 |
| 2017/0258889 A1 * | 9/2017 | Kaplan | .................. | A61K 39/20 |
| 2018/0008522 A1 * | 1/2018 | Altman | .................. | A61K 8/368 |
| 2018/0272030 A1 * | 9/2018 | Brown | .................. | A61L 27/227 |
| 2020/0165306 A1 * | 5/2020 | Omenetto | ............. | A61L 27/227 |
| 2020/0256009 A1 * | 8/2020 | Altman | ................. | D06M 15/15 |
| 2022/0193304 A1 * | 6/2022 | Altman | .................... | A61L 27/52 |

FOREIGN PATENT DOCUMENTS

| | | | | |
|---|---|---|---|---|
| WO | WO-2007016524 A2 * | 2/2007 | ................ | A61J 3/00 |
| WO | WO-2010042798 A2 * | 4/2010 | ......... | A61L 27/3604 |

OTHER PUBLICATIONS

Yun et al.—The role of Glycerol and water in flexible silksericin films—International Journal of Biological Macromolecules—vol. 82—(2016)—pp. 945-951.*
Li et al.—Flexible nanofibers-reinforced silk fibroin films plasticized by gycerol—Journal of Composites Part B—vol. 152—(2018)—pp. 305-310.*

* cited by examiner

*Primary Examiner* — Brian K Talbot
(74) *Attorney, Agent, or Firm* — Muncy, Geissler, Olds & Lowe, P.C.

(57) ABSTRACT

A method for making a silk protein film includes providing an aqueous solution of a silk protein, and annealing a mixture including the aqueous solution of the silk protein and a water-soluble polyhydroxy compound that is present in an amount ranging from 20 wt % to 60 wt % based on a total amount of the silk protein and the water-soluble polyhydroxy compound at an annealing temperature that is higher than 50° C. and lower than 180° C. and under a relative humidity of not higher than 30%, so as to form the silk protein film.

11 Claims, No Drawings

METHOD FOR MAKING SILK PROTEIN FILM

CROSS-REFERENCE TO RELATED APPLICATION

This application claims priority of Taiwanese Patent Application No. 108104427, filed on Feb. 11, 2019.

FIELD

The present disclosure relates to a method for making a film, and more particularly to a method for making a silk protein film.

BACKGROUND

Plastic products such as plastic wrap, plastic tableware, plastic bag, plastic tube, etc. are widely used due to convenience. However, excessive use of plastic products without restriction causes serious problems regarding disposal thereof, particularly for plastic products that are non-combustible and non-biodegradable, and burning of plastic products might even produce toxic substances such as dioxin, which results in considerable environmental damage.

With increasing environmental awareness, various natural polymer films such as silk protein films that has superior physical properties and is easily biodegradable, have been utilized to replace plastic products so as to solve the abovementioned problems.

A conventional method for preparing a silk protein film includes the following steps (A) to (C). In step (A), silkworm cocoons were sequentially subjected to sericin removal treatment, dissolution treatment, and dialysis treatment so as to obtain an aqueous solution of a silk protein. In step (B), the aqueous solution of the silk protein was coated or casted on a carrier and then was allowed to dry naturally for 12 hours to 16 hours through evaporation of water contained therein, so as to form a coating film on the carrier that contains water-soluble silk protein with dominated random coil conformation. In step (C), the coating film was subjected to a transformation treatment to induce crystallinization, which can be conducted in two ways, either by water annealing or by immersion in an organic solvent such as methanol or ethanol. Water annealing is a process in which the coating film is incubated in a humid environment for several hours. To be specific, the coating film was placed in a vacuum desiccator that is connected to an air extractor and that includes a water-filled tray, and then the air extractor is operated to generate water vapor inside the vacuum desiccator, such that the coating film was allowed to water anneal (i.e., moistened with the water vapor) in a humid environment for one day, such that the structural configuration of the silk protein in the water-soluble silk protein film can be transformed from random coil conformation to stable silk I structure that contains a mixture of α-helix, β-sheet and random coil conformations, thereby obtaining the water-insoluble silk protein film. Alternatively, immersion of the water-soluble silk protein film in alcoholic solution for one day, in which the alcohol is present in an amount that is greater than 95 wt %, can also transform the structural configuration of the silk protein to achieve high β-sheet crystallinity.

However, regardless of whether the abovementioned transformation treatment is conducted or not, the conventional method for making the silk protein film requires more than 12 hours, which leads to poor production efficiency. In addition, after the transformation treatment, the thus obtained water-insoluble silk protein film has various problems such as forming wrinkles, high surface hardness, poor flexibility and ductility, and easily breaks when stretched. Moreover, the water-insoluble silk protein film requires storage in water which confers flexibility thereto, but may harden after drying. Therefore, when the water-insoluble silk protein film is used as a wrapper such as a cling wrap, it not only has poor flexibility and ductility, but also has poor adhesion to the surface of an object (e.g., dishes and other tableware) to be wrapped.

SUMMARY

Therefore, an object of the present disclosure is to provide a method for making a silk protein film, which can alleviate at least one of the drawbacks of the prior art.

According to the present disclosure, a method for making a silk protein film includes providing an aqueous solution of a silk protein, and annealing a mixture including the aqueous solution of the silk protein and a water-soluble polyhydroxy compound that is present in an amount ranging from 20 wt % to 60 wt % based on a total amount of the silk protein and the water-soluble polyhydroxy compound at an annealing temperature that is higher than 50° C. and lower than 180° C. and under a relative humidity of not higher than 30%, so as to form the silk protein film.

DETAILED DESCRIPTION

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides a method for making a silk protein film. The method includes providing an aqueous solution of a silk protein, and annealing a mixture that includes the aqueous solution of the silk protein and a water-soluble polyhydroxy compound that is present in an amount ranging from 20 wt % to 60 wt % based on a total amount of the silk protein and the water-soluble polyhydroxy compound at an annealing temperature that is higher than 50° C. and lower than 180° C. and under a relative humidity of not higher than 30%, so as to form the silk protein film.

As used herein, the term "annealing" refers to the process of heating a coating layered structure on a substrate to a certain temperature (annealing temperature), maintaining the temperature for a certain period of time (annealing time), and then allowing the resulting layer, typically a film, to slowly cool to room temperature.

In certain embodiments, the silk protein includes fibroin.

As used herein, the term "fibroin" may include silkworm fibroin and insect or spider silk protein. In certain embodiments, fibroin is obtained from a solution containing a dissolved silkworm silk or spider silk. The silkworm silk protein is obtained, for example, from *Bombyx mori*, and the spider silk protein is obtained from *Nephila clavipes*. In the alternative, the silk proteins suitable for use according to the present disclosure can be obtained from a solution containing a genetically engineered silk, such as from bacteria, yeast, mammalian cells, transgenic animals or transgenic plants, as disclosed in, e.g., WO 97/08315 and U.S. Pat. No. 5,245,012.

The silk fibroin may have a structural configuration that may include, but are not limited to, random coil, α-helix, and β-sheet.

In the annealing step, the water-soluble polyhydroxy compound in the mixture may transform the structural configuration of the silk fibroin from random coil to α-helix and/or β-sheet, so as to form the silk protein film that is not water-soluble. The water-soluble polyhydroxy compound can be miscible with the aqueous solution of the silk protein in the mixture and is not easily evaporated, and hydroxyl groups of the water-soluble polyhydroxy compound may improve peptide chains of the silk fibroin by forming hydrogen bonds, thereby allowing the silk protein to easily fold into α-helix and β-sheet configurations. In addition, the water-soluble polyhydroxy compound may increase torsional space between silk protein molecules, and may be regarded as a plasticizer to improve flexibility and ductility of the thus formed silk protein film, as well as to confer the silk protein film with improved transparency and non-sticky feeling.

To improve these properties of the silk protein film, in certain embodiments, the water-soluble polyhydroxy compound is present in an amount ranging from 20 wt % to 50 wt % based on a total amount of the silk protein and the water-soluble polyhydroxy compound. In other embodiments, the water-soluble polyhydroxy compound is present in an amount ranging from 25 wt % to 40 wt % based on a total amount of the silk protein and the water-soluble polyhydroxy compound.

Examples of the water-soluble polyhydroxy compound may include, but are not limited to, glycerol, saccharide, and a combination thereof. Examples of the saccharide may include, but are not limited to, monosaccharide, disaccharide, and a combination thereof.

An example of the monosaccharide may include, but is not limited to, glucose. An example of the disaccharide may include, but is not limited to, trehalose.

In an exemplary embodiment, the water-soluble polyhydroxy compound is glycerol. In another exemplary embodiment, the water-soluble polyhydroxy compound is trehalose.

In certain embodiments, the annealing step is performed at an annealing temperature ranging from 60° C. to 170° C. To increase production efficiency of the method of this disclosure, the annealing temperature may be controlled within a range of 100° C. to 120° C.

In addition, the annealing step may be performed under a relative humidity of not higher than 10%.

In certain embodiments, the mixture is substantially free of an organic solvent. That is, the mixture to be used for making the silk protein film is less toxic, and the thus prepared silk protein film is eco-friendly and safe for living organisms.

In certain embodiments, the method further includes applying the mixture to a substrate before the annealing step by a process well known to those skilled in the art. Examples of the process may include, but are not limited to, spin coating, spray coating, casting, and combinations thereof. The substrate suitable for this disclosure may include, but are not limited to, a plastic substrate, a silica substrate, a paper substrate and a metallic substrate.

The silk protein film formed by the method of the present disclosure may have improved properties, such as biodegradability, transparency, heat resistance, flexibility, and ductility, and may maintain its flexibility in a freezing environment, such as an environment having a temperature of −80° C. Therefore, the silk protein film may be manufactured into a wrapper (i.e., cling film) and a container (e.g., eco-friendly bag). Further, due to its water-insoluble properties, the silk protein film may be used as an outer or inner waterproof film of paper-based products, such as paper dishes, paper cups, or paper straws.

The present disclosure will be further described by way of the following examples. However, it should be understood that the following examples are intended solely for the purpose of illustration and should not be construed as limiting the present disclosure in practice.

EXAMPLES

Preparation of Aqueous Solution of Silk Protein

An aqueous solution of a silk protein was prepared as follows. The silkworm cocoons were cut into small pieces and boiled in a 0.02 M sodium carbonate solution for 30 minutes to extract sericin that is dissolved in the solution. The remaining silk fibroin fibers were recovered and rinsed with reverse osmosis (R.O.) water three times, followed by squeezing excess water therefrom, and then dried in an oven at 37° C. to form dried silk fibroin fibers.

Afterwards, the dried silk fibroin fibers were dissolved in 20 mL of a 9.3 M lithium bromide (LiBr) solution at 60° C. for 4 hours. The dissolved silk fibroin fibers were dialyzed with distilled water in a weight ratio of 1:12 using dialysis cassettes (molecular weight cut-off (MWCO) is 3.5 KDa) for 48 hours, in which the deionized water was replaced 6 times, so as to remove LiBr.

The resultant solution in the dialysis cassettes was further dialyzed with 1 L of a 10% (wt/vol) polyethylene glycol (molecular weight: 10 kDa) solution for 20 hours so as to obtain a dialyzed solution having 15 wt % of silk fibroin. The dialyzed solution was then diluted with double deionized water to prepare a first aqueous solution of silk protein having 8 wt % of silk fibroin (abbreviated as "fibroin aqueous solution 1"), and a second aqueous solution of silk protein having 10 wt % of silk fibroin (abbreviated as "fibroin aqueous solution 2").

Preparation of Silk Protein Film

Example 1 (E1)

1000 g of the fibroin aqueous solution 1 (i.e., 80 mg of silk fibroin) was mixed with 27 mg of a water-soluble polyhydroxy compound (i.e., glycerol) to forma mixture, in which glycerol is present in an amount of 25.2 wt % based on the total amount of the silk fibroin and glycerol. The mixture was evenly applied to a plastic substrate made from polyethylene terephthalate (PET) by spray-coating to form a coating film. The coating film on the plastic substrate was placed in a vacuum desiccator that was connected to an air extractor to control a relative humidity inside the vacuum desiccator, and then subjected to an annealing treatment. In the annealing treatment, the coating film was heated to a desired annealing temperature (110° C.) and then incubated at the annealing temperature under a desired relative humidity (10%) for a certain period of time (i.e., annealing time) to induce crystallization. The resultant silk protein film was slowly cooled to room temperature (i.e., 25° C. to 30° C.).

The annealing time represents the time for forming the silk protein film, which would not rupture after detaching from the plastic substrate.

Examples 2 to 7 (E2 to E7)

The silk protein films of E2 to E7 were made by procedures similar to those of E1, except that 1000 g of the fibroin aqueous solution 2 was used in E2 to E7 to mix with 34 mg of glycerol. That is, glycerol is present in an amount of 25.2 wt % based on the total amount of the silk fibroin and glycerol. In addition, the annealing in E2 to E7 were 65° C., 110° C., 125° C., 150° C., 160° C., and 170° C., respectively.

Examples 8 and 9 (E8 and E9)

The silk protein films of E8 and E9 were made by procedures similar to those of E3, except that the amounts of glycerol used in E8 and E9 were 66 mg and 150 mg, respectively. That is, based on the total amount of the silk fibroin and glycerol, glycerol is present in the mixture in an amount of 39.8 wt % in E8 and in an amount of 60 wt % in E9.

Example 10 (E10)

The silk protein film of E10 was made by procedures similar to those of E3, except that the glycerol was replaced with 25 g of trehalose. That is, trehalose is present in the mixture in an amount of 20 wt % based on the total amount of the silk fibroin and trehalose.

Example 11 (E11)

The silk protein film of E11 was made by procedures similar to those in E8, except that, the plastic substrate was replaced with a paper substrate.

Comparative Example 1 (CE1)

The silk protein film of CE1 was made by procedures similar to those of E3, except that glycerol was not used to form the mixture.

Comparative Example 2 (CE2)

The silk protein film of CE2 was made by procedures similar to those of E8, except that the annealing temperature was 50° C.

Comparative Example 3 (CE3)

The silk protein film of CE3 was made by procedures similar to those of E8, except that the annealing temperature was 180° C.

Property Evaluation of the Silk Protein Film

1. Transparency

Transparency of the silk protein film of each of E1 to E10 and CE1 to CE3 was measured using a multifunctional spectrophotometer (Manufacturer: Yunyang Technology Co., Ltd.; Model No.: TRF2006) under a scanning wavelength ranging from 200 nm to 850 nm.

2. Heat-Resistant Temperature

Heat-resistant temperature of the silk protein film of each of E1 to E10 and CE1 to CE3 was measured in accordance with standardized methods of test for labeling conformance of heat tolerance of plastic good utensils, containers and packages publishes, i.e., MOHWU0023.02 established by the Ministry of Health and Welfare, Taiwan, and in accordance with Chinese National Standards CNS 2446, the National Standards of Taiwan, for plastic tablewares. In brief, an upper side of the silk protein film serving as a test sample is adhered on a paper sheet using a double-sided adhesive tape, and a weight of 10 g is clamped onto the lower side of the silk protein film, and then placed in an oven with a desired temperature for one hour. Afterwards, the heated test sample was observed whether the appearance thereof had ruptured. However, the double-sided adhesive tape would melt at a temperature of 200° C. and cannot exert its adhesive effect, and thus, the heat-resistant temperature of each of the silk protein film was measured up to 185° C.

3. Elongation Rate (Tensile Strength)

The silk protein film of each of E1 to E10 and CE1 to CE3 was cut into 3 test samples each having a length of 12.5 cm and a width of 3.0 cm, and the elongation of each of the test sample was measured using a tensile strength testing machine (Manufacturer: Yang Yi Technology Co., Ltd.; Model No.: H35) under a speed of 0.2 mm/min, and the elongation rate thereof were calculated according to the following equation:

Elongation rate (%)=[($L2-L1$)/$L1$]×100%, wherein L1 represents original length of the test sample, and L2 represents the elongated length of the test sample at break.

4. Moisture Content

The silk protein film of each of E1 to E10 and CE1 to CE3 was weighed using an analytical balance (Manufacturer: Shimadzu Corporation; Model No.: AX120) to obtain a weight indicated by A, and then dried in an oven having a temperature of 65° C. for 16 hours, followed by weighing the dried silk protein film to obtain a weight indicated by B. The moisture content of the silk protein film was calculated according to the following equation:

Moisture content (%)=[($A-B$)/$A$]×100%.

The parameters of the method for making the silk protein films of each of E1 to E10 and CE1 to CE3 and the evaluated properties thereof are summarized in Table 1.

TABLE 1

| Silk protein film | | | Examples | | | | | | | | | | | Comparative Examples | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| Silk protein (mg) | | 80 | | | | | | | 100 | | | | | | 100 | |
| Water-soluble polyhydroxy compound | Glycerol (mg) | 27 | | | 34 | | | | 66 | 150 | — | 66 | — | 66 | 66 |
| | Trehalose (mg) | | | | | | | | | | — | 25 | — | | | — |

TABLE 1-continued

| Silk protein film | Examples | | | | | | | | | | | Comparative Examples | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Wt % of the water-soluble polyhydroxy compound (based on a total amount of the silk protein and the polyhydroxy compound) | 25.2 | | | 25.3 | | | | 39.8 | 60 | 20 | 39.8 | — | 39.8 | 39.8 |
| Annealing temperature (° C.) | 110 | 65 | 110 | 125 | 150 | 160 | 170 | 110 | 110 | 110 | 110 | 110 | 50 | 180 |
| Annealing time (s) | 300 | 420 | 180 | 150 | 120 | 90 | 55 | 180 | 180 | 360 | 180 | 180 | 2100 | 30 |
| Property evaluation — Thickness (±2 μm) | 8 | 10 | 10 | 10 | 10 | 10 | 10 | 10 | 10 | 10 | 10 | 10 | 10 | Uneven |
| Tranparency (%) | 88 | 88 | 88 | 86 | 86 | 87 | 89 | 88 | 87 | 65 | N.D. | 88 | 80 | 81 |
| Heat-resistant temperature (° C.) | 185 | 185 | 185 | 185 | 185 | 185 | 185 | 185 | 185 | 100 | N.D. | 125 | 185 | 185 |
| Elongation rate (±2 μm) | 80 | 83 | 91 | 92 | 94 | 91 | 71 | 90 | 84 | 59 | N.D. | 3 | 73 | 70 |
| Moisture content (±2%) | 19 | 21 | 26 | 25 | 21 | 20 | 18 | 39 | 61 | 8 | N.D. | 10 | 38 | N.D. |

"—": not added;
"N.D.": not determined

As shown in Table 1, as compared to the silk protein film of CE1 which excludes the use of the water-soluble polyhydroxy compound such as glycerol, the silk protein films of E1 to E10 have an excellent elongation rate, indicating that the silk protein film obtained by the method for making the silk protein film of the present disclosure has good flexibility and ductility.

In addition, although the silk protein films of E1 to E10 and CE2 and CE3 have desired transparency and heat-resistant temperature, the silk protein film of CE2, which was prepared by annealing at 50° C., cannot be formed in a short time period (i.e., within 30 seconds to 30 minutes), and the silk protein film of CE3, which was prepared by annealing at 180° C., has uneven thickness. In contrast, the silk protein films of E1 to E11, which were prepared by annealing at a temperature higher than 50° C. and lower than 180° C., can be formed in a short time period and have uniform thickness.

In summary, by virtue of the annealing treatment conducted at an annealing temperature of higher than 50° C. and lower than 180° C., and under the relative humidity of not higher than 30%, the method for making the silk protein film of the present disclosure has advantageous characteristic such as formation of the silk protein film in a short time period, (i.e., within 30 seconds to 30 minutes), thus improving the production efficiency. In addition, by inclusion of the water-soluble polyhydroxy compound, the silk protein film obtained by the method of the present disclosure is conferred with good flexibility and ductility.

In the description above, for the purposes of explanation, numerous specific details have been set forth in order to provide a thorough understanding of the embodiments. It will be apparent, however, to one skilled in the art, that one or more other embodiments may be practiced without some of these specific details.

It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for making a silk protein film, comprising: providing an aqueous solution of a silk protein; and annealing a film by a mixture including the aqueous solution of the silk protein and a water-soluble polyhydroxy compound that is present in an amount ranging from 20 wt % to 60 wt % based on a total amount of the silk protein and the water-soluble polyhydroxy compound at an annealing temperature that is higher than 50° C. and lower than 180° C. and under a relative humidity of not higher than 30%, so as to form the silk protein film.

2. The method of claim 1, further comprising applying the mixture to a substrate before the annealing step.

3. The method of claim 2, wherein applying the mixture to the substrate is performed by a process selected from the group consisting of spin coating, spray coating, casting, and combinations thereof.

4. The method of claim 1, wherein the silk protein includes silk fibroin.

5. The method of claim 1, wherein the water-soluble polyhydroxy compound is selected from the group consisting of glycerol, saccharide, and a combination thereof.

6. The method of claim 5, wherein the water-soluble polyhydroxy compound is the saccharide selected from the group consisting of monosaccharide, disaccharide, and a combination thereof.

7. The method of claim 1, wherein the annealing step is performed at an annealing temperature ranging from 60° C. to 170° C.

8. The method of claim 1, wherein the annealing step is performed under a relative humidity of not higher than 10%.

9. The method of claim 1, wherein the mixture is substantially free of an organic solvent.

10. The method of claim 1, wherein the water-soluble polyhydroxy compound is present in an amount ranging from 20 wt % to 50 wt % based on the total amount of the silk protein and the water-soluble polyhydroxy compound.

11. The method of claim 10, wherein the water-soluble polyhydroxy compound is present in an amount ranging from 25 wt % to 40 wt % based on the total amount of the silk protein and the water-soluble polyhydroxy compound.

* * * * *